US007651544B1

(12) United States Patent
Fester et al.

(10) Patent No.: US 7,651,544 B1
(45) Date of Patent: Jan. 26, 2010

(54) VACUUM CLEANER WITH MULTIPLE CYCLONIC DIRT SEPARATORS AND BOTTOM DISCHARGE DIRT CUP

(75) Inventors: Joseph A. Fester, Ada, MI (US); Charles Reed, Jr., Rockford, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 601 days.

(21) Appl. No.: 11/275,383

(22) Filed: Dec. 29, 2005

Related U.S. Application Data

(63) Continuation-in-part of application No. 11/275,120, filed on Dec. 12, 2005, now Pat. No. 7,547,336.

(60) Provisional application No. 60/593,125, filed on Dec. 13, 2004.

(51) Int. Cl.
*B01D 45/12* (2006.01)

(52) U.S. Cl. ............................ 55/343; 55/346; 55/426; 55/459.1; 55/DIG. 3

(58) Field of Classification Search .................. 55/337, 55/343, 346, 349, 424, 429, 459.1, DIG. 3, 55/426
See application file for complete search history.

(56) References Cited

U.S. PATENT DOCUMENTS

| | | | | |
|---|---|---|---|---|
| 2,846,024 | A * | 8/1958 | Bremi | 55/413 |
| 6,070,291 | A | 6/2000 | Bair et al. | |
| 6,129,775 | A | 10/2000 | Conrad | |
| 6,238,451 | B1 | 5/2001 | Conrad | |
| 6,341,404 | B1 | 1/2002 | Salo et al. | |
| 6,607,572 | B2 | 8/2003 | Gammack et al. | |
| 7,169,201 | B2 * | 1/2007 | Oh et al. | 55/343 |
| 7,247,181 | B2 * | 7/2007 | Hansen et al. | 55/337 |
| 7,335,241 | B2 * | 2/2008 | Oh et al. | 55/343 |
| 7,395,579 | B2 * | 7/2008 | Oh | 15/347 |
| 2002/0134059 | A1 | 9/2002 | Oh | |
| 2005/0050678 | A1 | 3/2005 | Oh et al. | |
| 2005/0138763 | A1 | 6/2005 | Tanner et al. | |

FOREIGN PATENT DOCUMENTS

| | | | |
|---|---|---|---|
| GB | 2369291 | A | 5/2005 |
| WO | 2007008772 | A2 | 1/2007 |

* cited by examiner

*Primary Examiner*—Robert A Hopkins
(74) *Attorney, Agent, or Firm*—McGarry Bair PC

(57) ABSTRACT

A vacuum cleaner comprises a cyclonic separator having a first cyclone and a plurality of downstream secondary cyclones. The first cyclone comprises a side wall defining a first cyclonic chamber, and the secondary cyclones each comprise a side wall defining a second cyclonic chamber. A dirt cup assembly is mounted below the cyclonic separator to collect contaminants separated in the first and second cyclonic chambers. The secondary cyclones can be arranged around the first cyclone side wall and form a gap between adjacent secondary cyclones so that the first cyclone side wall is exposed at the gap. A working air conduit can extend through the first cyclone and the dirt cup assembly to couple the secondary cyclones to a suction source located below the dirt cup assembly. Furthermore, the secondary cyclones can have a vortex stabilizer.

7 Claims, 11 Drawing Sheets

VACUUM CLEANER WITH MULTIPLE CYCLONIC DIRT SEPARATORS AND BOTTOM DISCHARGE DIRT CUP

CROSS-REFERENCE TO RELATED APPLICATION

This application is a Continuation-in-part of U.S. patent application Ser. No. 11/275,120, filed Dec. 12, 2005, now U.S. Pat. No. 7,547,336 which claims the benefit of U.S. patent application No. 60/593,125, filed Dec. 13, 2004, both of which are incorporated herein in their entirety.

BACKGROUND OF THE INVENTION

1. Field of the Invention

The invention relates to a vacuum cleaner with a cyclonic dirt separator having a first cyclone and a plurality of downstream secondary cyclones. In one of its aspects, the invention relates to a cyclonic dirt separator with secondary cyclones arranged around the first cyclone to provide an unobstructed view of at least a portion of the first cyclone. In another of its aspects, the invention relates to a cyclonic dirt separator with a dirt cup assembly mounted below the cyclones and a working air conduit that extends through the first cyclone and the dirt cup assembly. In another of its aspects, the invention relates to a cyclonic dirt separator with secondary cyclones having a vortex stabilizer.

2. Description of the Related Art

Cyclone separators are well-known. Some follow the textbook examples using frustoconical shape separators, and others use high-speed rotational motion of the air/dirt to separate the dirt by centrifugal force. Typically, working air enters and exits at an upper portion of the cyclone separator, and the bottom portion of the cyclone separator is used to collect debris. Furthermore, in an effort to efficiently distribute weight of and upright vacuum cleaner, the suction source that creates the working air flow is typically placed at the bottom of a handle assembly and below the cyclone separator. This arrangement, therefore, requires an exhaust air path from an upper portion of the cyclone assembly and down the handle to the suction source. This airpath can be tortuous and formed by multiple parts that can allow for air leaks, which negatively impact airflow and, necessarily, cleaning performance.

U.S. Pat. No. 6,238,451 to Conrad discloses a cyclonic separator in a vacuum cleaner comprising a single first stage cyclone and a plurality of vertically aligned secondary downstream cyclones arranged in parallel relative to one another. The secondary cyclones are located within the same perimeter of and directly above the upstream cyclone. This arrangement of cyclones necessarily creates a tall unit because the downstream cyclones are located above the upstream cyclone.

U.S. Pat. No. 6,607,572 to Dyson discloses a cyclonic separating apparatus with upstream and downstream cyclonic units, wherein the downstream units comprise a plurality of downstream cyclones located above the upstream cyclone and inverted relative to the upstream cyclone.

U.S. Pat. No. 6,070,291 to Bair et al. and its progeny shortens the air path from the cyclone exhaust to the motor inlet. These patents disclose a pleated cylindrical filter in a cyclonic chamber whereby the working air is drawn through the cylindrical filter, through the bottom of the cyclonic chamber, through another filter, and directly into the suction source inlet. The suction source is in a vertical position below the cyclonic chamber. The vertical orientation of the suction source is undesirable due to the amount of space needed at the bottom of the handle to accommodate the suction source in this position. Additionally, the motor shaft of the vertically oriented suction source cannot be utilized to power a horizontal axis agitator.

U.S. Pat. No. 6,341,404 to Salo et al. discloses a bottom discharge cyclone chamber with the suction source mounted horizontally below the cyclone chamber. However, motor exhaust air is redirected back up into an annular exhaust plenum located below the cyclone chamber, and the motor exhaust exits from the exhaust plenum in a radial fashion. This exhaust path includes a number of turns, which tend to create backpressure and, therefore, reduce efficiency.

U.S. Pat. No. 6,129,775 to Conrad discloses a cyclone separator with a number of different forms of flow inhibitors, such as a terminal insert, to interfere with airflow within the cyclone separator. As shown in FIG. 14(*d*), the terminal insert can comprise a plurality of longitudinally extending members, such as rods, which extend upwardly into the cyclone separator cavity from the bottom surface of the cyclone separator. The rods are said to interact with circulating fluid to disrupt its rotational motion. The rods can be positioned symmetrically or non-symmetrically around longitudinal axis of the separator. The rods can be a variety of shapes such as, in transverse section, squares, ellipses or other closed convex or abode shapes. Further, the transverse section of rods can vary longitudinally.

U.S. Patent Application Publication No. 2005/00500678 to Oh et al. and its progeny disclose a cyclone dust separating apparatus comprising a primary cyclone and a plurality of downstream secondary cyclones arranged around the primary cyclone. As a result of this configuration, the secondary cyclones obstruct the view of the primary cyclone, and the user cannot visually observe the operation of the primary cyclone. Additionally, the working air exiting the secondary cyclones exits the cyclone dust separating apparatus through an upper opening.

SUMMARY OF THE INVENTION

According to the invention, a vacuum cleaner comprises a cyclonic separator that includes a first cyclone having a side wall defining a first cyclonic chamber for separating contaminants from an air stream as the air stream travels about the first cyclonic chamber from an air inlet to an air outlet, and a plurality of secondary cyclones downstream from the first cyclone and arranged around the side wall of the first cyclone, each of the secondary cyclones having a side wall defining a second cyclonic chamber for further separating contaminants from the air stream as the air stream travels about the second cyclonic chamber from an air inlet to an air outlet thereof. The vacuum cleaner further includes a nozzle housing including a suction opening fluidly coupled with the air inlet of the first cyclonic chamber and a suction source coupled to the suction opening and to the first and second cyclonic chambers and adapted to establish and maintain the air stream from the suction opening, through the first cyclonic airflow chamber, and through the second cyclonic airflow chambers.

According to one embodiment of the invention, the secondary cyclones form at least one gap between adjacent secondary cyclones, and the first cyclone side wall is exposed to the outside of the cyclonic separator at the at least one gap.

Advantageously, the first cyclone side wall is preferably formed of a translucent material at least at the at least one gap to provide an unobstructed view of the first cyclonic airflow chamber through the first cyclone side wall and through the at least one gap in the secondary cyclones.

The vacuum cleaner typically further comprises an upright housing with an opening that receives the cyclonic separator, and the at least one gap is formed at a front portion of the cyclonic separator for an unobstructed view of the first cyclone side wall when the cyclonic separator is mounted to the upright housing.

In a preferred embodiment, the air inlet to the first cyclone is positioned in the side wall of the first cyclone and distal from the at least one gap. In another preferred embodiment, the secondary cyclones form two gaps, and the air inlet to the first cyclone is positioned in one of the two gaps. Preferably, the two gaps are formed at opposite sides of first cyclone side wall.

According to another embodiment of the invention, a vacuum cleaner further includes a dirt cup assembly mounted beneath the cyclonic dirt separator to collect the contaminants separated by the first cyclonic chamber and the second cyclonic chambers; and a working air conduit extending through the first cyclone and the dirt cup assembly and fluidly coupling the air outlets of the second cyclonic chambers to an inlet of the suction source.

In a preferred embodiment of the invention, the secondary cyclones are arranged in groups. In an exemplary embodiment of the invention, one of the groups of secondary cyclones comprises four of the secondary cyclones, and another of the groups comprises five of the secondary cyclones. Further, each of the groups of secondary cyclones is enclosed by a side wall spaced from the first cyclone side wall. Preferably, the enclosing side wall of the groups of secondary cyclones is translucent.

Typically, the secondary cyclones are arranged in parallel. Preferably, the secondary cyclones have a generally vertical central longitudinal axis parallel to a central longitudinal axis of the first cyclone. Further, the secondary cyclones are frustoconical, and the first cyclone is cylindrical.

In a preferred embodiment of the invention, the dirt cup assembly comprises a first collecting region for collecting the contaminants separated in the first cyclonic chamber and a second collecting region for collecting the contaminants separated in the second cyclonic chamber. Preferably, the second collecting region is formed by a collecting cup positioned in the first collecting region.

Typically, a filter assembly is mounted between the working air conduit and the inlet of the suction source. Further, the working air conduit extends through a central portion of the first collecting region of the dirt cup assembly in a preferred embodiment of the invention.

In accordance with yet another embodiment of the invention, at least one of the secondary cyclones has a vortex stabilizer. According to one embodiment, all of the secondary cyclones have a vortex stabilizer. According to another embodiment, the secondary cyclones are frustoconical. Preferably, the vortex stabilizer is located at a bottom portion of the secondary cyclone. Further, the vortex stabilizer can comprise a stabilizer plate. A debris outlet can be formed in the side wall of the secondary cyclone adjacent to the stabilizer plate. Further, the air inlet and air outlet of the secondary cyclone can be located at an upper portion of the secondary cyclone.

DESCRIPTION OF THE PREFERRED EMBODIMENT

Figure 1:
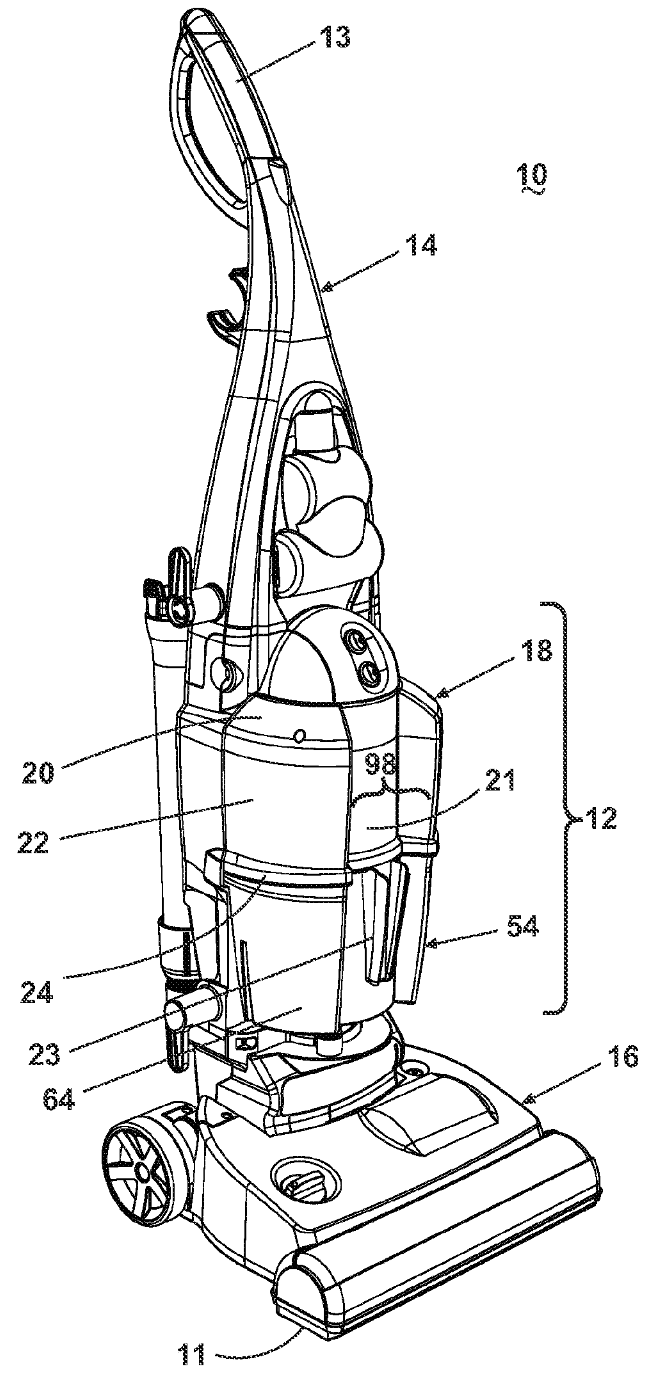
FIG. 1 is a perspective view of an upright vacuum cleaner with a cyclonic dirt separator and dirt cup assembly according to the invention.
Figure 2:
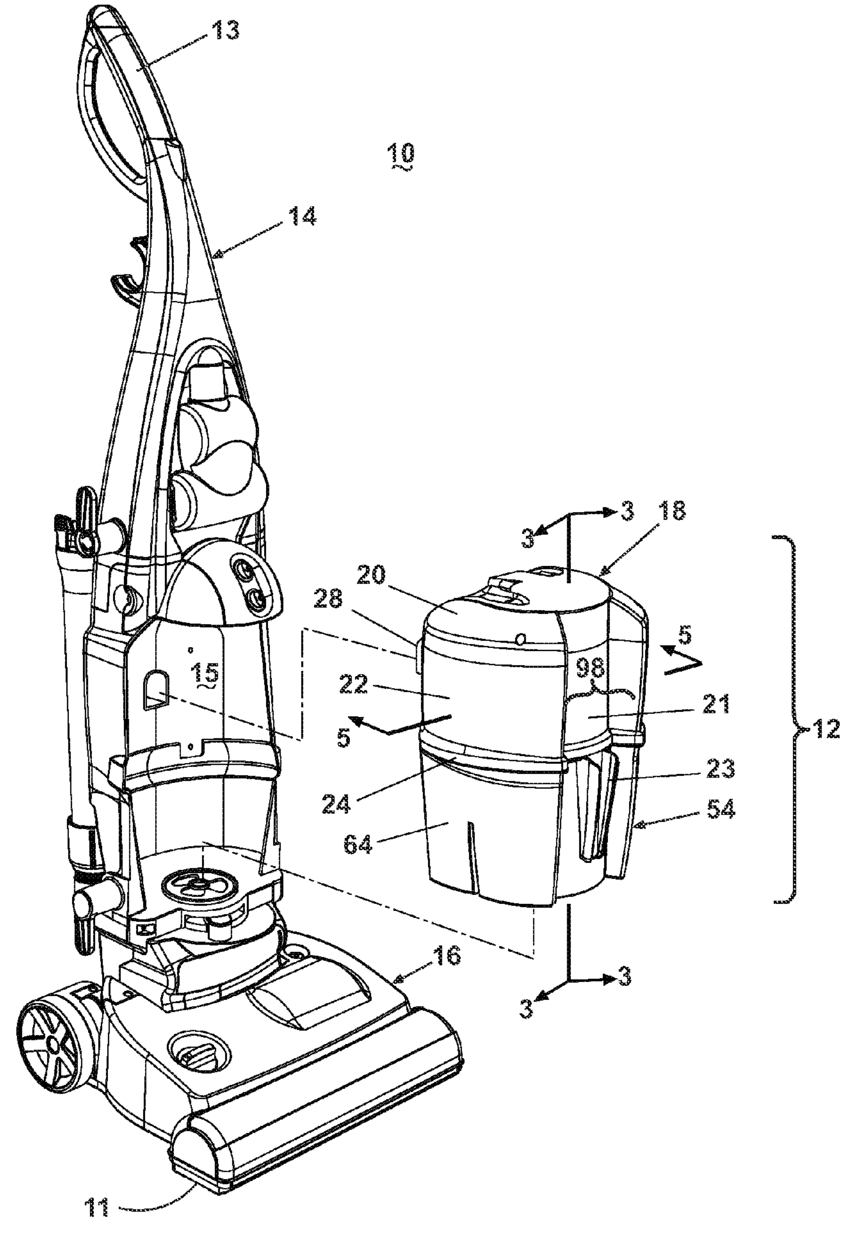
FIG. 2 is a view similar to FIG. 1 with the cyclonic dirt separator and dirt cup assembly exploded from the upright vacuum cleaner.

Referring now to the drawings and to FIGS. 1 and 2 in particular, an upright vacuum cleaner 10 comprises an upright handle housing 14 with a handle grip 13 formed at an upper end and pivotally mounted to a nozzle base housing 16 at a lower end. The nozzle base housing 16 comprises a suction nozzle opening 11 on a forward portion thereof. The upright handle housing 14 has an opening 15 that receives a cyclonic dirt separator and dirt cup assembly 12 comprising a cyclone separator assembly 18 and a dirt cup assembly 54. The dirt cup assembly 54 is removably mounted to the upright handle housing 14 and includes a grip 23 to facilitate insertion and removal of the dirt cup assembly 54. The grip 23 can be separately formed and attached to the dirt cup assembly 54 in a commonly known manner, such as with screws. However, the grip 23 can also be integrally formed with the dirt cup assembly 54 or can be fastened in other commonly known ways, such as with adhesives or ultrasonic welding.

Figure 3:
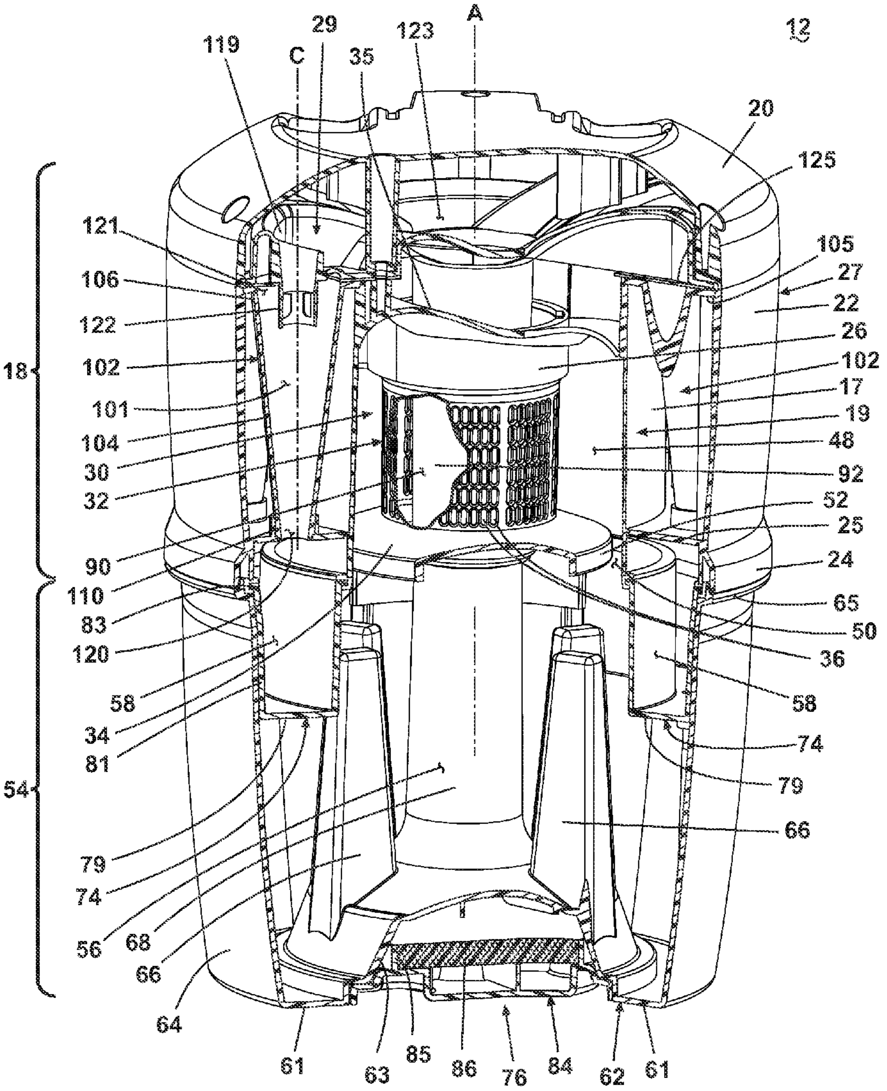
FIG. 3 is a sectional view taken along line 3-3 of FIG. 2.
Figure 4:
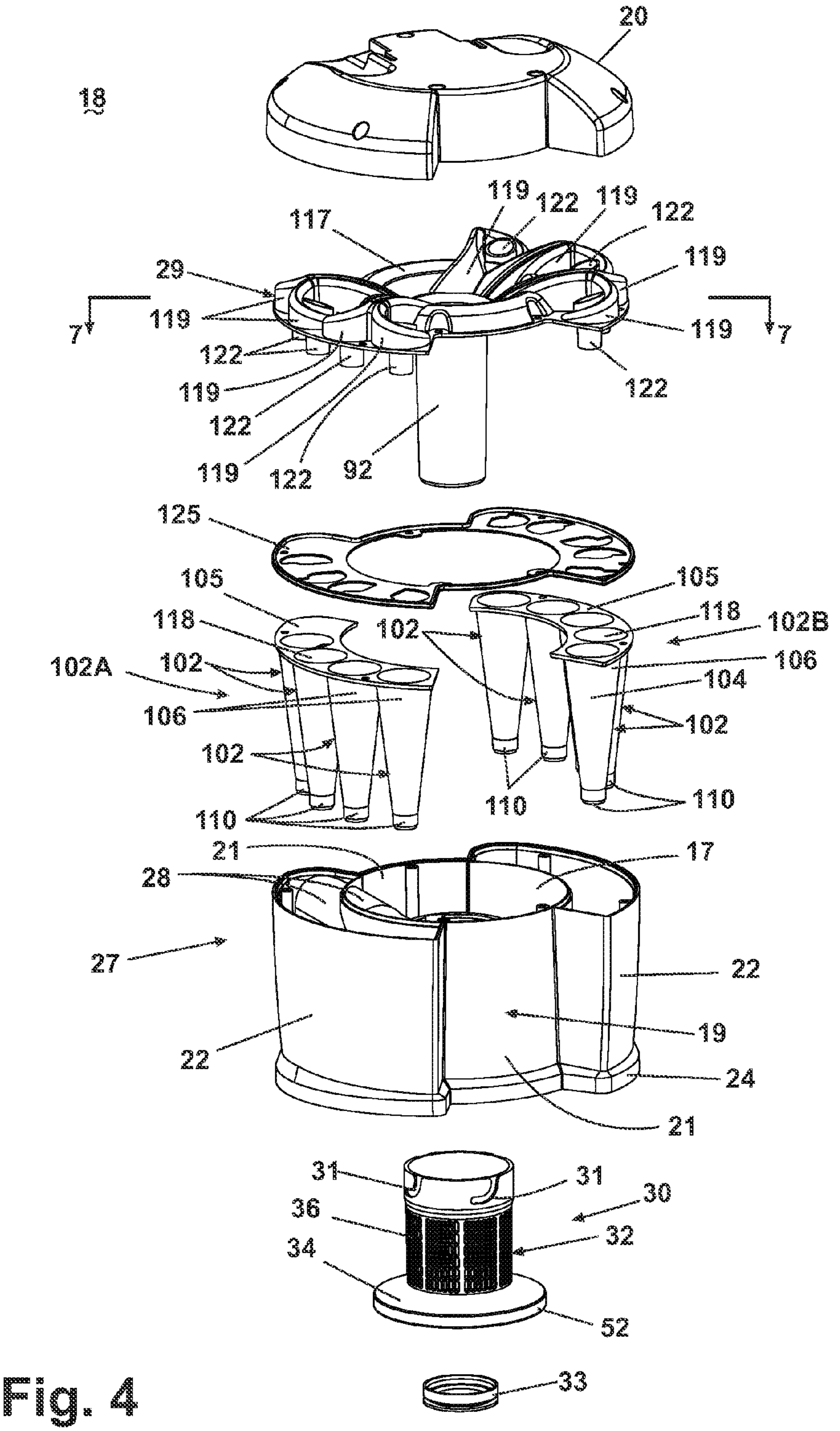
FIG. 4 is an exploded perspective view of a cyclonic separator assembly of the cyclonic dirt separator and dirt cup assembly of FIG. 1.
Figure 5:
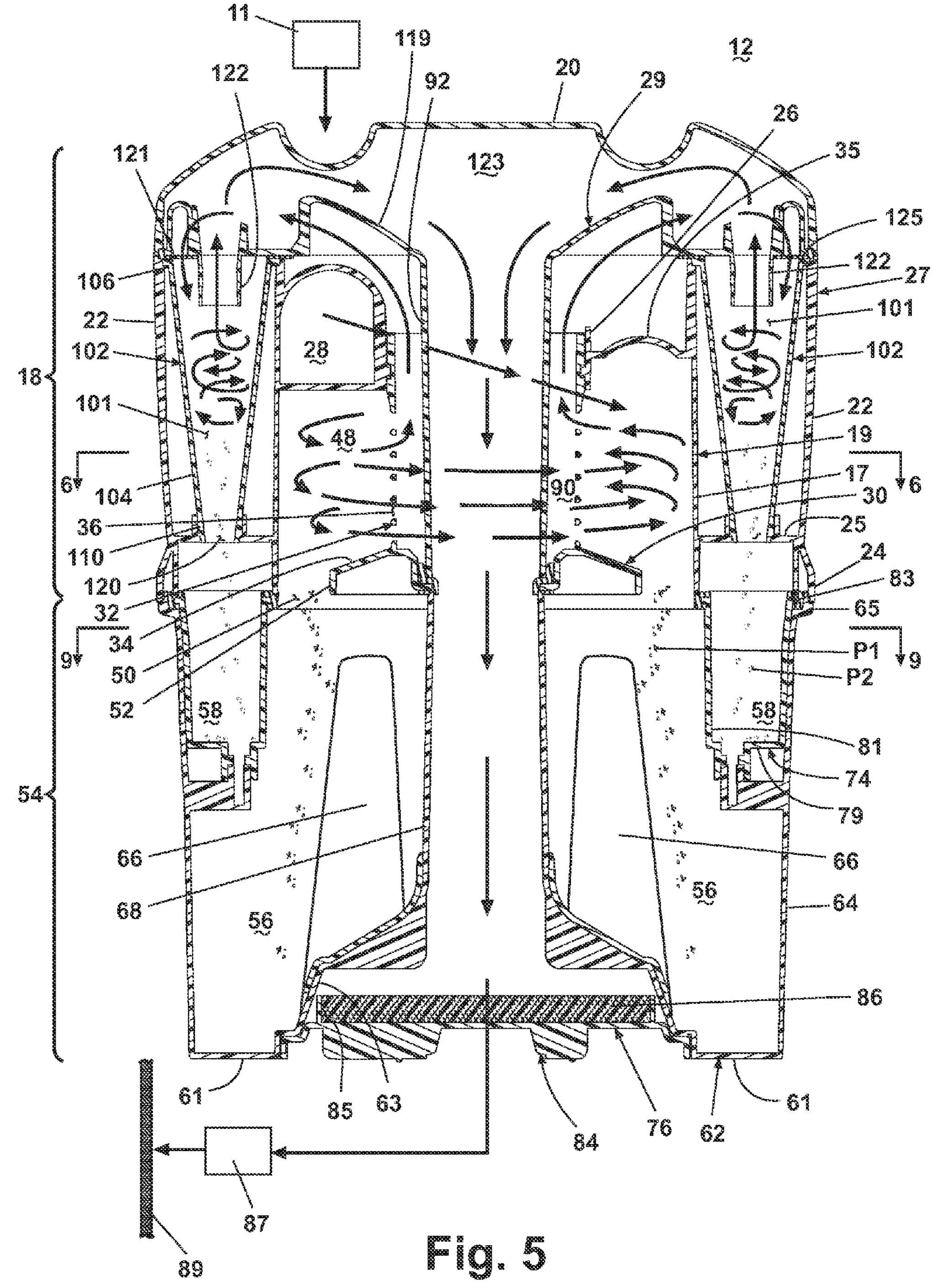
FIG. 5 is a sectional view taken along line 5-5 of FIG. 2.

Referring to FIGS. 3-5, the cyclone separator assembly 18 comprises a cyclone housing 27 having a primary separation region with a primary cyclone 19 and a secondary separation region that receives a plurality of secondary cyclones 102. The primary separation region is formed by a generally cylindrical primary separator side wall 17 and has a generally vertical central longitudinal axis A. A primary separator upper wall 35, which is best viewed in FIGS. 3 and 5, extends in a generally horizontal orientation near an upper end of the primary separator side wall 17. An annular collar 26 is formed centrally in the primary separator upper wall 35 such that the annular collar 26 is centered within the primary separation region.

The secondary separation region is separated into two regions, with each of the regions enclosed at its perimeter by a secondary region side wall 22 radially spaced from the primary separator side wall 17 and joined to the primary separator side wall 17 near a lower end by a bottom wall 25 that extends in a perpendicular manner from an inside surface of the secondary region side wall 22 to an outside surface of the generally cylindrical primary separator side wall 17. Together, the secondary region side walls 22 and exposed portions 21 of the generally cylindrical primary separator side wall 17 between the secondary region side walls 22, which all terminate in a lower offset lip 24, form an exterior surface of the cyclone housing 27. Thus, the exposed portions 21 of the primary separator side wall 17 are exposed to the outside of the cyclonic dirt separator and dirt cup assembly 12.

A cyclone cap 20 mounted to an upper end of the cyclone housing 27 defines a top for the cyclone separator assembly 18, and a secondary air manifold 29 is supported between the cyclone housing 27 and the cyclone cap 20. The secondary air manifold 29 comprises a depending hollow air duct 92 that extends through the collar 26 into the primary cyclone region. As best viewed in FIG. 4, a tangential air inlet 28 extends through one of the secondary region side walls 22 and the primary separator side wall 17 proximate the primary separator upper wall 35 for generating a tangential airflow into the primary separation region.

With continued reference to FIGS. 3 and 4, an exhaust assembly 30 is mounted to the annular collar 26 in the primary separation region. The exhaust assembly 30 includes a hollow cylindrical cage 32 that terminates at a lower end at a radially extending separator plate 34 having an outer edge 52. A plurality of apertures 36 are formed in an axial alignment in the cage 32 above the separator plate 34. The cage 32 defines a working air path; air enters the path by flowing radially inward through the apertures 36 and then upward through the hollow cage 32. The cage 32 and the separator plate 34 are removably mounted to the annular collar 26 in the primary cyclone region via a bayonet-type fitting between a projection on the annular collar 26 and a slot 31 on the cage 32 to provide a twist and lock connection. However, it is within the scope of the invention to use other mechanical fastening means to removably mount the exhaust assembly 30 to the annular collar 26. For example, friction fits, ramped threads, detents, or any other commonly known fastening method can be utilized.

Referring additionally to FIG. 5, a primary cyclonic toroidal chamber 48 is defined horizontally between the cage 32 and the primary separator side wall 17 and vertically between the primary separator upper wall 35 and the separator plate 34. In one embodiment, the tangential air inlet 28 is vertically aligned between the primary separator upper wall 35 and the separator plate 34 and slightly inclined such that the tangential airflow generated from the tangential air inlet 28 is directed in a slightly downward direction tangentially into the primary cyclonic toroidal chamber 48.

Referring now to FIG. 5, a working airflow, which is represented by arrows, containing particulate matter, passes through the tangential air inlet 28 and into the primary cyclonic toroidal chamber 48, where it travels around the exhaust assembly 30. As the airflow travels about the primary cyclonic toroidal chamber 48, heavier dirt particles P1 are forced toward the primary separator side wall 17. Due to gravity and axial components of the forces imparted by the working air, the particles P1 fall through a gap 50 defined between the edge 52 of the separator plate 34 and the primary separator side wall 17. The particles P1 that fall through the gap 50 continue to fall into the dirt cup assembly 54, where they are collected in a primary dirt collection region 56 of the dirt cup assembly 54. An upper end of the dirt cup assembly 54 is received in a nesting relationship in the lower offset lip 24 of the secondary region side wall 22 and the exposed portions 21 of the primary separator side wall 17 to seal the cyclone separator assembly 18 to the dirt cup assembly 54. The primary dirt collecting region 56 thereby performs the function of collecting the particles P1 separated from the airflow within the primary cyclone 19.

As the working air traverses through the primary cyclonic toroidal chamber 48 and casts the particles P1 toward the primary separator side wall 17, the working air is drawn inwardly through the apertures 36 of the exhaust assembly 30. In one embodiment, the apertures 36 have an oblong shape, but the apertures 36 can have any suitable geometry that prevents the particles P1 from exiting the primary cyclonic toroidal chamber 48 through the apertures 36. Rather, the particles P1 are urged toward the gap 50 by the circulating airflow in the primary cyclonic toroidal chamber 48.

Some fine debris can remain in the working air after it passes through the primary cyclonic toroidal chamber 48. As shown in FIG. 5, the working air that exits the primary cyclonic toroidal chamber 48 through the apertures 36 continues through a secondary cyclone toroidal path 90 formed between an inner surface of the exhaust assembly 30 and an outer solid surface of the air duct 92 depending from the secondary air manifold 29 in a coaxial relationship relative to the exhaust assembly 30. The secondary cyclone toroidal path 90 can also be viewed in FIG. 6. As shown in FIG. 5, the secondary cyclone toroidal path 90 directs the working air from the primary cyclone 19 to the secondary air manifold 29, which directs the working air to the plurality of secondary cyclones 102 located in the secondary cyclone region.

Referring now to FIGS. 3-6, the secondary cyclones 102 are arranged around the primary separator side wall 17 of the primary cyclone 19 in the two regions of the secondary cyclone region. In particular, the secondary cyclones 102 are arranged in two groups, a right group 102A and a left group 102B, with the right and left groups 102A, 102B corresponding to the two regions and positioned on opposite sides of a vertical plane B (FIG. 6) that includes the central longitudinal axis A and extends from back to front to effectively cut the cyclone separator assembly 18 in half. Thus, a front gap 98 is formed between adjacent secondary cyclones 102 at a front side of the cyclone separator assembly 18, and a rear gap 100 is formed between adjacent secondary cyclones 102 at a rear side of the cyclone separator assembly 18. According to the illustrated embodiment, the front and rear gaps 98, 100 are located diametrically opposite each other. The tangential air inlet 28 is positioned in the rear gap 100 near the right group 102A. The front and rear gaps 98, 100 are coincident with the exposed portions 21 of the primary separator side wall 17; therefore, none of the secondary cyclones 102 are located in front of the exposed portions 21 of the primary separator side wall 17 to obstruct view of the exposed portions 21. The exposed portions 21 of the primary separator side wall 17 can be made of a transparent or translucent material to allow the user to view the primary cyclonic toroidal chamber 48 through the front and rear gaps 98, 100 and through the exposed portions 21 of the primary separator side wall 17. However, only the front gap 98 is viewable when the cyclone separator assembly 18 is mounted in the opening 15 of the upright handle housing 14, as shown in FIG. 1. Additionally, the secondary region side wall 22 can be made of a transparent or translucent material to allow a user to view the secondary cyclones 102.

Figure 6:
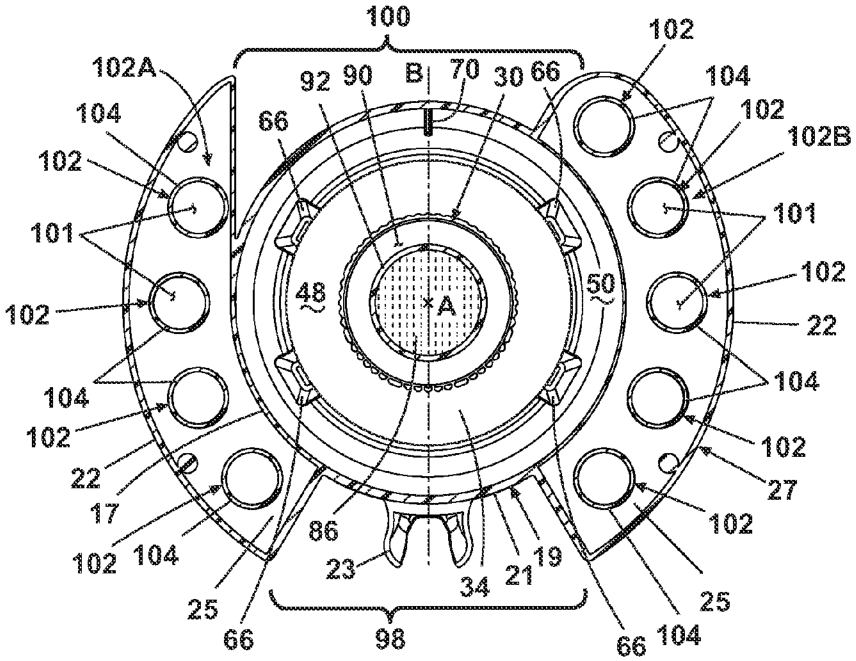
FIG. 6 is a sectional view taken along line 6-6 of FIG. 5.

As shown in FIGS. 4 and 6, in the illustrated embodiment, the right group 102A includes four of the secondary cyclones 102, and the left group 102B includes five of the secondary cyclones 102; however, it is within the scope of the invention for the right and left groups 102A, 102B to comprise any suitable number of the secondary cyclones 102. Further, it is within the scope of the invention to group the secondary cyclones 102 into more than two groups. Alternatively, all of the secondary cyclones 102 can be located on one side of the plane B, wherein the number of the secondary cyclones 102 can range from between one and ten or between three and seven. According to one embodiment, five of the secondary cyclones 102 are located all on one side of the plane B.

Referring again to FIGS. 3-6, the secondary cyclones 102 each comprise a frustoconical housing having a side wall 104 that defines a secondary cyclonic chamber 101. Each side wall 104 has an upper, larger end 106 that defines an aperture 118 that functions as both an air inlet and an air outlet for the secondary cyclonic chamber 101, as will be described in more detail below, and a lower, smaller end 110 forming a secondary debris outlet 120 through which particles P2 separated from the working air passes to a secondary dirt collecting region 58 of the dirt cup assembly 54. The secondary cyclones 102 in each of the groups 102A, 102B are connected to one another at the larger ends 106 via a housing support 105 that can either be a separate piece or integrally molded with the side walls 104. Each of the secondary cyclones 102 has a central longitudinal axis C (FIG. 3) parallel with the central longitudinal axis A of the primary cyclone 19. According to the illustrated embodiment, the central longitudinal axes A, C of the primary cyclone 19 and the secondary cyclones 102 are generally vertical. Alternatively, one or more of the central longitudinal axes A, C can be inclined relative to the vertical, and the secondary cyclones 102 can be inverted such that the larger end 106 is below the smaller end 110.

The size and shape of the secondary cyclones 102 are important for maximizing separation efficiency. In one embodiment, the aperture 118 at the larger end 106 of the side wall 104 has a surface area about ten times larger than that of the secondary debris outlet 120 at the smaller end 110. However, acceptable performance is obtained within a ratio of the larger end 106 to the smaller end 110 ranging between about two to one and about twenty to one, preferably between about three and a half to one and about eight and a half to one. The secondary region side wall 22 is tapered to correspond to the shapes of the secondary cyclones 102 located within the secondary region side wall 22. The secondary region side wall 22 tapers from its upper end, where it abuts the cyclone cap 20, to its lower end, which is at the offset lip 24.

Other arrangements of the secondary cyclones 102 have been found to perform in an acceptable manner. Configurations of between one and fifteen of the secondary cyclones 102 arranged in split fashion as previously described or completely encircling the primary separator side wall 17 are contemplated. As can be appreciated, the overall size of the cyclonic dirt separator and dirt cup assembly 12 is limited by the size of the opening 15 in the upright handle housing 14. Therefore, given a fixed maximum size opening 15, as the number of the secondary cyclones 102 increases, the individual size of each of the secondary cyclones 102 must be reduced so that the cyclonic dirt separator and dirt cup assembly 12 fits within the opening 15. It has been found that in this arrangement with this type of primary cyclone, when the larger end 106 is smaller than one inch in diameter, the secondary cyclones 102 tend to clog with debris. Given this dimensional limitation, groupings of between five and eleven of the secondary cyclones 102 have been deemed acceptable for portable upright vacuum cleaners 10 sized similarly to most current commercially available portable upright vacuum cleaners.

Figure 7:
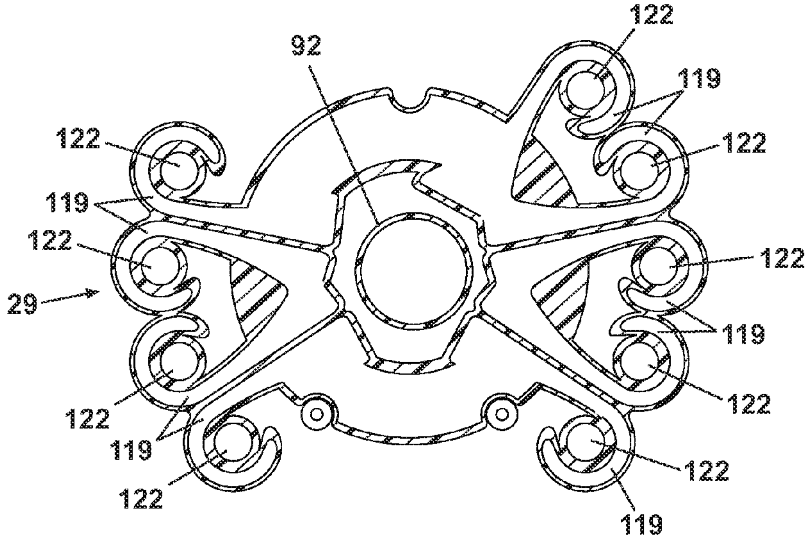
FIG. 7 is a sectional view taken along line 7-7 of FIG. 4.
Figure 8:
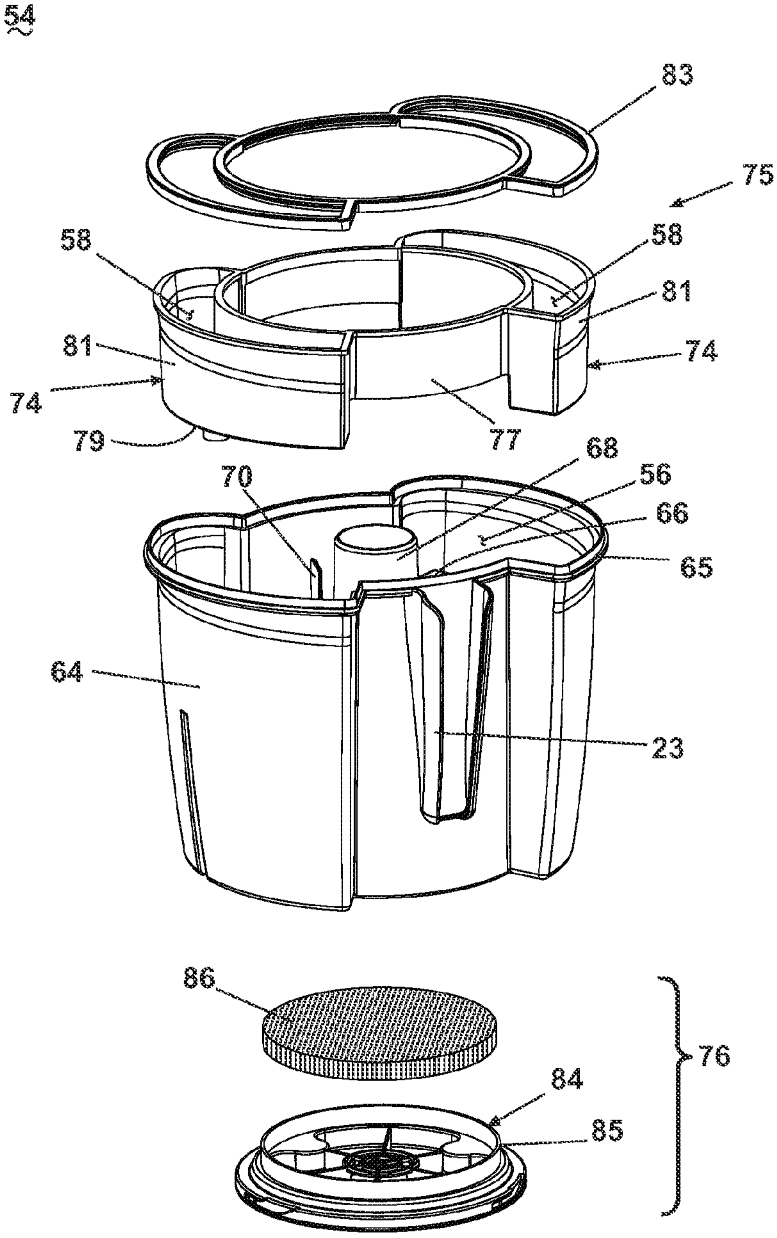
FIG. 8 is an exploded perspective view of a dirt cup assembly from the cyclonic dirt separator and dirt cup assembly of FIG. 1.

As stated above, the secondary air manifold 29 is positioned between the cyclone housing 27 and the cyclone cap 20. As best viewed in FIG. 4, an air manifold gasket 125 is positioned between the secondary air manifold 29 and the cyclone housing 27 to form an airtight seal therebetween. A plurality of working air inlet passageways 119, which are best viewed in FIG. 7, are formed in the secondary air manifold 29 for dividing the working air that flows from the secondary cyclone toroidal path 90 and directing the divided working air into each of the secondary cyclones 102. The number of the working air inlet passageways 119 equals the number of the secondary cyclones 102; each of the working air inlet passageways 119 corresponds to one of the secondary cyclones 102. Referring back to FIGS. 3-5, each of the working air inlet passageways 119 terminates at the aperture 118 of the corresponding secondary cyclone 102 to form an inlet 121 to the secondary cyclones 102. The working air exits the secondary cyclones 102 through corresponding working air outlets 122 formed in the secondary air manifold 29 and received by the corresponding apertures 118. The number of the working air outlets 122 equals the number of the secondary cyclones 102; each of the working air outlets 122 corresponds to one of the secondary cyclones 102. In one embodiment, the surface area of the smaller end 110 of the secondary cyclones 102 is about equal to or greater than the surface area of the working air outlet 122. The working air outlets 122 fluidly communicate with a working air exhaust chamber 123 formed between an upper surface of the secondary air manifold 29 and a lower surface of the cyclone cap 20. The working air exhaust chamber 123 is in fluid communication with the hollow air outlet duct 92 of the secondary air manifold 29.

Referring now FIGS. 3, 5, 8, and 9, the dirt cup assembly 54 comprises the primary dirt collecting region 56, the secondary dirt collecting region 58, a centrally oriented working air standpipe 68, and a post-cyclone filter assembly 76. The primary dirt collecting region 56 is formed by an upstanding dirt cup side wall 64 and an annular dirt cup bottom wall 62 having a flat portion 61 that surrounds a frustoconical portion 63. The hollow standpipe 68 extends upward into the primary dirt collecting region 56 from the frustoconical portion 63. According to the illustrated embodiment, the hollow standpipe 68 is centered in the primary dirt collecting region 56, but it is within the scope of the invention for the hollow standpipe 68 to be offset from the center of the primary dirt collecting region 56. When the dirt cup assembly 54 is mounted below the cyclone separator assembly 18, the hollow standpipe 68 meets the air outlet duct 92 to form a working air conduit that extends through the primary cyclone 19 and the dirt cup assembly 54. The mating surfaces between the air outlet duct 92 and the hollow standpipe 68 are effectively sealed with a gasket 33 to prevent air leaks therebetween. The dirt cup side wall 64 terminates at an upper lip 65, and, when the dirt cup assembly 54 is mounted below the cyclone separator assembly 18, a dirt cup gasket 83 is positioned between the upper lip 65 of the dirt cup assembly 54 and the lower offset lip 24 of the cyclone separator assembly 18 to prevent air leaks therebetween. The dirt cup side wall 64 slightly tapers from the upper lip 65 to the bottom wall 62. The taper creates an air flow pattern within the dirt cup assembly 54 that minimizes debris re-entrainment. Additionally, the taper creates a narrower dirt cup assembly 54 that is sized to facilitate manipulation of the dirt cup assembly 54 with only one hand by a user.

Figure 9:
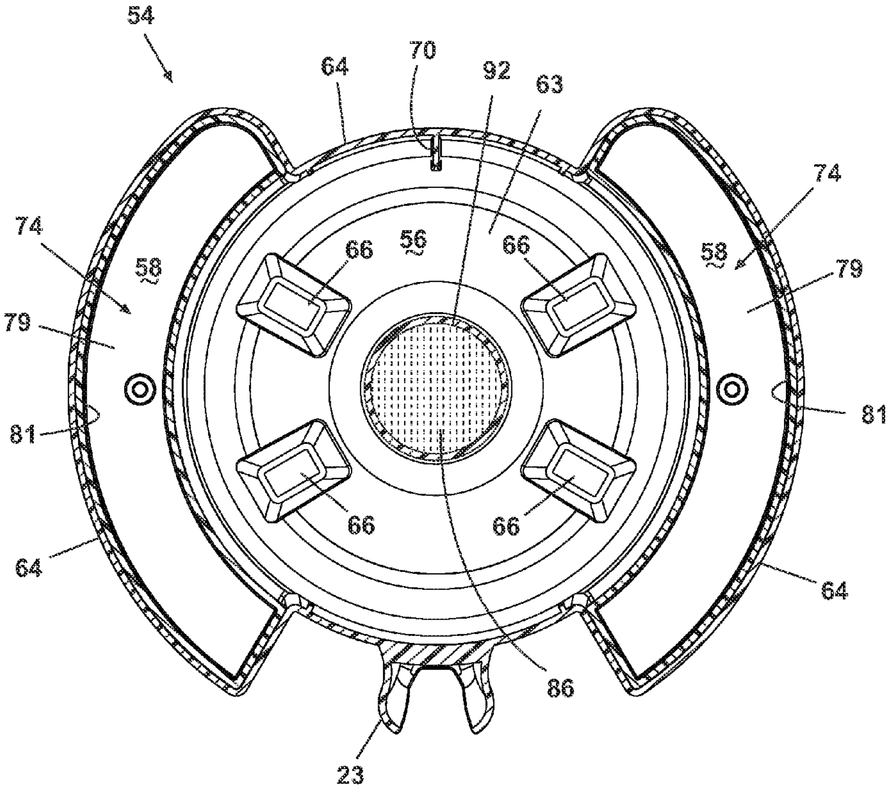
FIG. 9 is a sectional view taken along line 9-9 of FIG. 5.

To further inhibit re-entrainment of debris, a plurality of upstanding prongs or fingers 66 project upwardly from the bottom wall 62, particularly from the frustoconical portion 63 of the bottom wall 62, as best viewed in FIG. 9. The fingers 66 can function in varying arrangements, but in the illustrated embodiment, the fingers 66 are arranged generally symmetrically about the hollow standpipe 68 centrally located within the dirt cup assembly 54. According to one embodiment, the fingers 66 are spaced from the standpipe 68. The dirt cup assembly 54 further includes a fin 70 affixed to or integrally formed with the dirt cup side wall 64. The fin 70 is generally rectangular in transverse cross-section and projects radially inwardly from the side wall 64 toward the standpipe 68. Optionally, the dirt cup assembly 54 can comprise more than one of the fins 70 circumferentially spaced around the dirt cup side wall 64. Details of acceptable sizing and spacing of the fingers 66 and the fin 70 are found in U.S. Pat. No. 6,810,557 to Hansen et al., which is incorporated herein by reference in its entirety.

The secondary dirt collecting region 58 is formed by a secondary dirt collecting cup 75 comprising a pair of collecting units 74 joined by a cup support 77. Each of the units 74 comprises a bottom wall 79 and an upstanding side wall 81 to form an open top receptacle. The secondary dirt collecting cup 75 sits inside the dirt cup side wall 64 such that the primary dirt collecting region 56 receives the secondary dirt collecting cup 75, and the bottom walls 79 of the collecting units 74 are spaced from the bottom wall 82 of the primary dirt collecting region 56. The secondary dirt collecting cup 75 is oriented so that the each of the collecting units 74 is positioned directly below one of the right and left groups 102A, 102B of the secondary cyclones 102. In particular, the collecting units 74 are located below the secondary debris outlets 120 of the secondary cyclones 102 to collect the particles P2 that fall therefrom, as illustrated in FIG. 5. In the illustrated embodiment, one of the collecting units 74 is used to collect the particles P2 from more than one of the secondary cyclones 102. However, a series of individual collecting units 74 can be used to collect debris from each corresponding secondary cyclone 102. The secondary dirt collecting cup 75 can be fixedly mounted to the dirt cup assembly 54, integrally formed with the dirt cup assembly 54, or removably mounted to the dirt cup assembly 54.

The filter assembly 76 comprises a filter cage 84 that holds a filter element 86. The filter assembly 76 is located below the standpipe 68 such that working air that flows downward through the standpipe 68 must pass through the filter assembly 76 before reaching an inlet of a suction source 87 located downstream from the filter assembly 76. The filter cage 84 comprises an open tray 85 to removably receive the filter element 86. Preferably, the filter element 86 is an open cell foam filter; however, paper pleated filters and other common filter element types can also be used. The filter cage 84 is secured to with the bottom wall 62 of the primary dirt collection region 56 via a quarter-turn bayonet fastener or any other suitable mechanical fastening means, as previously described.

The dirt cup assembly 54 is removably mounted to the upright vacuum cleaner 10. The dirt cup assembly 54 is generally vertically adjustable relative to the cyclone separator assembly 18, such as by a cam mechanism mounted to the upright handle housing 14, so that it can be raised into an engaged and operative position underneath the cyclone separator assembly 18. When in this position, the upper lip 65 of the dirt cup side wall 64 is received within the lower offset lip 24 of the cyclone separator assembly 18 and is sealed by the gasket 83, which helps prevent the dirt cup assembly 54 from being dislodged from the cyclone separator assembly 18. To remove the dirt cup assembly 54 from the cyclone separator assembly 18, such as to discard accumulated dirt, the dirt cup assembly 54 is displaced downwardly from the cyclone separator assembly 18, such as by the cam mechanism. Once disengaged from the offset lip 24, the dirt cup assembly 54 can be slid forward and removed from the separator 18.

Referring to FIG. 5, in operation, the suction source 87, which can be located in either the upright handle housing 14 or the nozzle base housing 16, generates a working airflow through the upright vacuum cleaner 10. Dirty working air enters the cleaner 10 at the suction nozzle opening 11 and flows through a suitable conduit (not shown) to the tangential air inlet 28 to the cyclonic dirt separator and dirt cup assembly 12. The working air traverses around the primary cyclonic toroidal chamber 48 and casts dirt particles toward the primary separator side wall 17, thereby separating the larger particles P1 from the air stream and depositing the larger particles P1, by force of gravity, through the gap 50 between the separator plate edge 52 and the primary separator side wall 17 into the primary dirt collecting region 56. The working air exits the primary cyclonic toroidal chamber 48 through the apertures 36 and flows into the secondary cyclone toroidal path 90 to the secondary air manifold 29. In the secondary air manifold 29, the working air is evenly divided to each of the working air inlet passageways 119, which direct the working air to the plurality of secondary cyclones 102, which are arranged in parallel. After flowing through the working air inlet passageways 119, the working air tangentially enters the respective secondary cyclones 102 at the larger end 106 to create a swirling action within the secondary cyclonic chamber 101 defined by the respective side wall 104. As the swirling air approaches the smaller end 110 of the secondary cyclones 102, the velocity of the air speeds up and throws the fine secondary particles P2 remaining in the working air toward the side wall 104 in a fashion similar to that of the primary cyclone 19. The fine secondary particles P2 exit the secondary cyclone 102 through the secondary debris outlet 120, and the fine secondary particles P2 fall, under force of gravity, into the secondary dirt collecting region 58 of the dirt cup assembly 54.

The working air in the secondary cyclones 102 is then forced to change direction and exits the secondary cyclones 102 through the respective air outlet 122 of the secondary air manifold 29 received by the aperture 118. The working air passes through the air outlets 122, through the working air exhaust chamber 123, and into the air outlet duct 92. The working air then passes downward through the air outlet duct 92, through the dirt cup standpipe 68, and into the filter assembly 76, where the filter element 86 captures additional particulate material before the working air is drawn into the suction source 87. Optionally, a pre-motor filter (not shown) can be located immediately upstream of the suction source 87 to prevent any remaining debris from entering the suction source 87. Debris that enters the suction source 87 can damage internal components and shorten the useful life of the suction source 87. The working air then passes through an optional post-motor filter 89, such as a HEPA filter, before exiting the upright vacuum cleaner 10.

Figure 10:
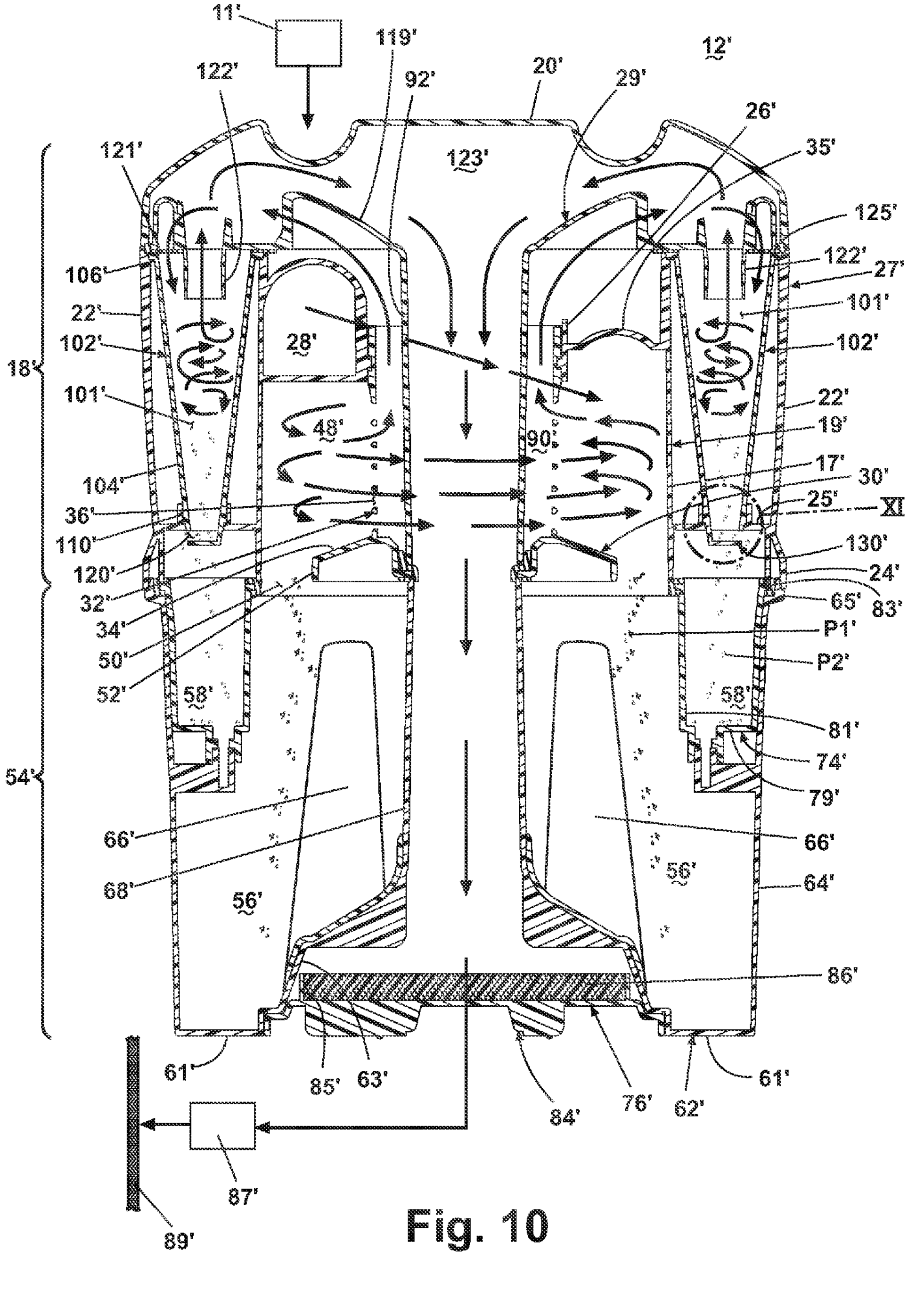
FIG. 10 is a sectional view similar to FIG. 5 of an alternative embodiment cyclonic dirt separator and dirt cup assembly.
Figure 11:
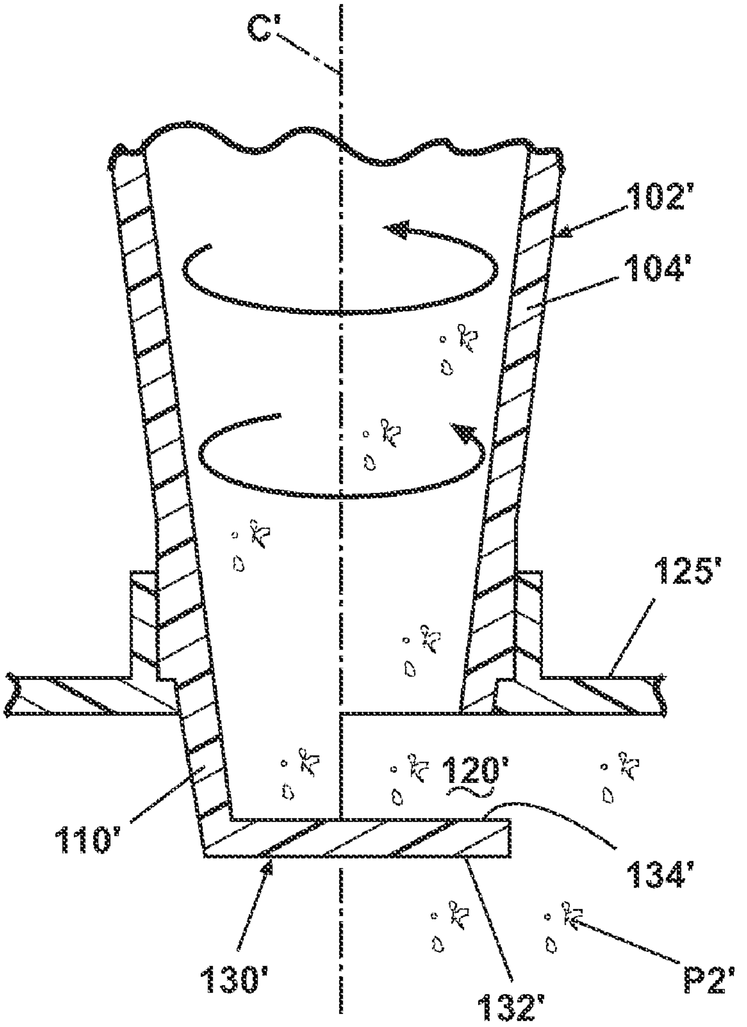
FIG. 11 is an enlarged view of the region labeled XI in FIG. 10.
Figure 12:
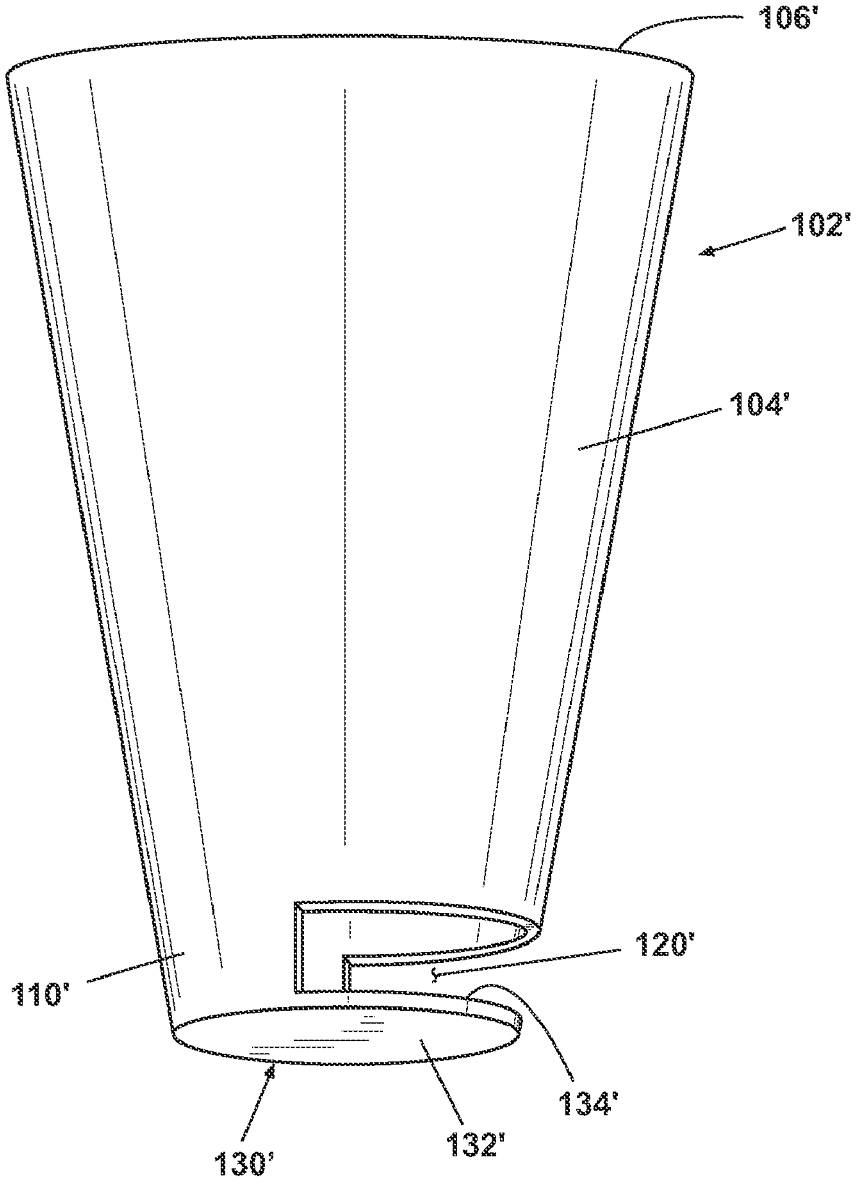
FIG. 12 is a perspective view of a secondary cyclone from the cyclonic dirt separator and dirt cup assembly of FIG. 10.

An alternative embodiment of the cyclonic dirt separator and dirt cup assembly 12' is illustrated in FIGS. 10-12, where elements similar to those of the embodiment shown in FIGS. 1-9 are identified with the same reference numeral bearing a prime symbol ('). The alternative embodiment cyclonic dirt separator and dirt cup assembly 12' is substantially identical to the cyclonic dirt separator and dirt cup assembly 12 shown in FIGS. 1-9, except that the secondary cyclones 102' each include a vortex stabilizer 130'.

The vortex stabilizer 130' comprises a circular plate 132' joined to or integrally formed with the secondary cyclone side wall 104' at the lower, smaller end 110'. The plate 132' is oriented generally perpendicular to the central longitudinal axis C of the secondary cyclone 102', and an upper vortex stabilizer surface 134' of the plate 132' faces the secondary cyclonic chamber 101'. Because the plate 132' essentially closes the bottom end of the secondary cyclone 102', the secondary debris outlet 120' is formed in the side wall 104' just above the vortex stabilizer 130'. According to the illustrated embodiment, the secondary debris outlet 120' extends about halfway around the smaller end 110' of the side wall 104', but the secondary debris outlet 120' can have any suitable size.

The vortex stabilizer surface 134' provides a dedicated location for the bottom end of the cyclone vortex formed by the swirling air in the secondary cyclonic chamber 101' to reside. As a result, the vortex stabilizer surface 134' minimizes a walking or wandering effect that might otherwise occur. Confining the bottom end of the cyclone vortex improves separation efficiency of the secondary cyclones 102' and further prevents re-entrainment of the particles P2 already separated from the working air.

The vortex stabilizer surface 134' can be rigid or made of a flexible elastomeric material. An advantage of the flexible elastomeric material is that the vortex stabilizer surface 134' can vibrate and move in response to the vortex forces during operation. This movement of the vortex stabilizer surface 134' dislodges the particles P2 that can collect on the vortex stabilizer surface 134', thus automatically cleaning the vortex stabilizer surface 134'.

The operation of the alternative embodiment cyclonic dirt separator and dirt cup assembly 12' is substantially identical to that of the cyclonic dirt separator and dirt cup assembly 12 described above. However, the vortex stabilizer 130' functions to confine the bottom end of the cyclone vortex formed by the swirling air in the secondary cyclonic chamber 101' to within the vortex stabilizer surface 134'. Additionally, rather than the particles P2 falling straight downward from the secondary cyclones 102, the particles P2' are urged sideways through the secondary debris outlets 120' to exit the secondary cyclones 102' and collect in the secondary debris collection region 58'.

It is within the scope of the invention to utilize various types of vortex stabilizers for the secondary cyclones 102'. For example, the vortex stabilizer can comprise one or more rods or pins located at the smaller end 110' of the secondary cyclone 102' and extending towards the secondary cyclonic chamber 101'. Additionally, the vortex stabilizer can be located at an upper portion of the secondary cyclones 102' if the secondary cyclones are inverted.

While the cyclonic dirt separator and dirt cup assembly 12 has been described for use with the upright vacuum cleaner 10, it is within the scope of the invention to utilize the cyclonic separator and dirt cup assembly 12 in other types of vacuum cleaners, including canister vacuum cleaners and robotic vacuum cleaners.

The cyclonic dirt separator and dirt cup assembly 12 provides several advantages. For example, the secondary cyclones 102 are arranged around the first cyclone 19 to reduce the height of the cyclonic dirt separator and dirt cup assembly 12. Additionally, because the secondary cyclones 102 form the front gap 100, a user can visually inspect the primary cyclonic toroidal chamber 48 through the primary separator side wall 17 when the exposed portions 21 are made of a translucent material. As a result, the user can visually confirm that the cyclonic separator assembly 18 is properly functioning and identify the presence of clogs or other potential problems. Furthermore, the working air that exits the secondary cyclones 102 flows downward through the working air conduit formed by the air duct 92 and the standpipe 68 directly to the suction source 87. Consequently, the distance that the working air must travel between the secondary cyclones 102 and the suction source 87 is minimized, thereby reducing pressure losses and potential for leaks to develop.

While the invention has been specifically described in connection with certain specific embodiments thereof, it is to be understood that this is by way of illustration and not of limitation. Reasonable variation and modification are possible within the forgoing disclosure and drawings without departing from the spirit of the invention, which is defined in the appended claims.

What is claimed is:

1. A vacuum cleaner comprising:

a cyclonic separator comprising:

a first cyclone having a side wall defining a first cyclonic chamber for separating contaminants from an air stream as the air stream travels about the first cyclonic chamber from an air inlet to an air outlet; and a plurality of secondary cyclones downstream from the first cyclone, each of the secondary cyclones having a side wall defining a second cyclonic chamber for further separating contaminants from the air stream as the air stream travels about the second cyclonic chamber from an air inlet to an air outlet, and at least one of the secondary cyclones has a vortex stabilizer; and a nozzle housing including a suction opening coupled with the air inlet of the first cyclonic chamber; and a suction source coupled to the suction opening and to the first and second cyclonic chambers and adapted to establish and maintain the air stream from the suction opening, through the first cyclonic airflow chamber, and through the second cyclonic airflow chambers.

2. The vacuum cleaner according to claim 1, wherein all of the secondary cyclones have a vortex stabilizer.

3. The vacuum cleaner according to claim 1, wherein the at least one secondary cyclone is frustoconical.

4. The vacuum cleaner according to claim 1, wherein the vortex stabilizer is located at a bottom portion of the at least one secondary cyclone.

5. The vacuum cleaner according to claim 1, wherein the vortex stabilizer comprises a stabilizer plate.

6. The vacuum cleaner according to claim 5, wherein the at least one secondary cyclone further comprises a debris outlet formed in the side wall of the at least one secondary cyclone adjacent to the stabilizer plate.

7. The vacuum cleaner according to claim 6, wherein the air inlet and air outlet of the at least one secondary cyclone are located at an upper portion of the at least one secondary cyclone, and the debris outlet is located at a bottom portion of the at least one secondary cyclone.

* * * * *

UNITED STATES PATENT AND TRADEMARK OFFICE

CERTIFICATE OF CORRECTION

PATENT NO. : 7,651,544 B1
APPLICATION NO. : 11/275383
DATED : January 26, 2010
INVENTOR(S) : Fester et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Twenty-third Day of November, 2010

David J. Kappos

*Director of the United States Patent and Trademark Office*